US010600011B2

(12) United States Patent
Polonsky et al.

(10) Patent No.: US 10,600,011 B2
(45) Date of Patent: Mar. 24, 2020

(54) METHODS AND SYSTEMS FOR IMPROVING ENGAGEMENT WITH A RECOMMENDATION ENGINE THAT RECOMMENDS ITEMS, PEERS, AND SERVICES

(71) Applicant: Gartner, Inc., Stamford, CT (US)

(72) Inventors: Nir Polonsky, Ridgefield, CT (US); Kendall Bruce Davis, New Canaan, CT (US); Andrew Rosenblatt, Norwalk, CT (US); Girish Malangi, Bridgewater, NJ (US); Richard N. Cho, Tenafly, NJ (US)

(73) Assignee: Gartner, Inc., Stamford, CT (US)

( * ) Notice: Subject to any disclaimer, the term of this patent is extended or adjusted under 35 U.S.C. 154(b) by 964 days.

(21) Appl. No.: 14/191,872

(22) Filed: Feb. 27, 2014

(65) Prior Publication Data
US 2014/0257890 A1 Sep. 11, 2014

Related U.S. Application Data

(60) Provisional application No. 61/772,764, filed on Mar. 5, 2013.

(51) Int. Cl.
| | |
|---|---|
| *G06Q 10/00* | (2012.01) |
| *G06Q 10/06* | (2012.01) |
| *G06Q 30/02* | (2012.01) |
| *G06F 3/01* | (2006.01) |
| *G06F 15/16* | (2006.01) |

(52) U.S. Cl.
CPC .......... *G06Q 10/063* (2013.01); *G06Q 10/06* (2013.01); *G06Q 30/02* (2013.01); *G06Q 30/0269* (2013.01); *G06F 3/01* (2013.01); *G06F 15/16* (2013.01)

(58) Field of Classification Search
CPC .................................................. G06Q 10/063
See application file for complete search history.

(56) References Cited

U.S. PATENT DOCUMENTS

| | | | | |
|---|---|---|---|---|
| 5,528,748 A | * | 6/1996 | Wallace | G06F 11/2294 714/25 |
| 5,983,214 A | | 11/1999 | Lang et al. | |
| 6,029,161 A | | 2/2000 | Lang et al. | |

(Continued)

*Primary Examiner* — Matthew S Gart
*Assistant Examiner* — Tyrone E Singletary
(74) *Attorney, Agent, or Firm* — Lipsitz & McAllister, LLC (57) ABSTRACT

Computerized methods and systems for improving engagement with a recommendation engine that recommends items, peers, and services are provided. Stored data of a plurality of users is electronically accessed and analyzed. A respective passive profile is determined for each of the users based on the analyzing of the stored data. The respective passive profiles are then stored for use by the recommendation engine. The recommendation engine can then provide recommendations for at least one of items, peers, and services to a respective user based on at least the respective passive profile. The recommendations may be further based on at least one of an explicit profile comprising information provided by the respective user and an activity profile based on tracked activity of the respective user with regard to prior recommended items.

21 Claims, 4 Drawing Sheets

(56) References Cited

U.S. PATENT DOCUMENTS

| | | | |
|---|---|---|---|
| 6,078,916 A | 6/2000 | Culliss | |
| 6,078,928 A | 6/2000 | Schnase et al. | |
| 6,112,186 A * | 8/2000 | Bergh | G06Q 30/02 |
| | | | 705/7.32 |
| 6,175,842 B1 | 1/2001 | Kirk et al. | |
| 6,236,978 B1 | 5/2001 | Tuzhilin | |
| 6,236,980 B1 | 5/2001 | Reese | |
| 6,266,649 B1 | 7/2001 | Linden et al. | |
| 6,308,175 B1 | 10/2001 | Lang et al. | |
| 6,314,420 B1 | 11/2001 | Lang et al. | |
| 6,389,372 B1 | 5/2002 | Glance et al. | |
| 6,438,579 B1 | 8/2002 | Hosken | |
| 6,484,164 B1 | 11/2002 | Nikolovska et al. | |
| 6,571,216 B1 * | 5/2003 | Garg | G06Q 30/02 |
| | | | 705/14.25 |
| 6,981,214 B1 | 12/2005 | Miller et al. | |
| 7,016,307 B2 | 3/2006 | Vasudev et al. | |
| 7,035,838 B2 | 4/2006 | Nelson et al. | |
| 7,043,443 B1 | 5/2006 | Firestone | |
| 7,047,202 B2 | 5/2006 | Jaipuria et al. | |
| 7,069,308 B2 | 6/2006 | Abrams | |
| 7,167,910 B2 | 1/2007 | Farnham et al. | |
| 7,177,880 B2 | 2/2007 | Ruvolo et al. | |
| 7,188,153 B2 | 3/2007 | Lunt et al. | |
| 7,249,123 B2 | 7/2007 | Elder et al. | |
| 7,269,590 B2 | 9/2007 | Hull et al. | |
| 7,275,102 B2 | 9/2007 | Yeager et al. | |
| 7,315,826 B1 | 1/2008 | Guheen et al. | |
| 7,359,894 B1 | 4/2008 | Liebman et al. | |
| 7,451,161 B2 | 11/2008 | Zhu et al. | |
| 7,454,433 B2 | 11/2008 | Ebert | |
| 7,499,903 B2 | 3/2009 | Nevin et al. | |
| 7,506,001 B2 | 3/2009 | Johnson et al. | |
| 7,512,628 B2 | 3/2009 | Chess et al. | |
| 7,657,907 B2 | 2/2010 | Fennan et al. | |
| 7,680,820 B2 | 3/2010 | Denoue et al. | |
| 7,813,822 B1 | 10/2010 | Hoffberg | |
| 7,917,503 B2 | 3/2011 | Mowatt et al. | |
| 7,966,316 B2 | 6/2011 | Cao et al. | |
| 8,060,463 B1 | 11/2011 | Spiegel | |
| 8,108,778 B2 | 1/2012 | Athsani et al. | |
| 8,166,016 B2 | 4/2012 | Higgins et al. | |
| 8,184,797 B1 | 5/2012 | Rosen | |
| 8,244,674 B2 | 8/2012 | Davis et al. | |
| 8,311,835 B2 | 11/2012 | Lecoeuche | |
| 8,484,149 B1 | 7/2013 | Kelly | |
| 8,661,034 B2 | 2/2014 | Polonsky et al. | |
| 8,903,811 B2 | 12/2014 | Hueter et al. | |
| 8,918,391 B2 | 12/2014 | Polonsky et al. | |
| 8,930,204 B1 | 1/2015 | Igoe et al. | |
| 9,143,578 B2 | 9/2015 | Fourman | |
| 9,165,305 B1 | 10/2015 | Chandra et al. | |
| 9,176,824 B1 * | 11/2015 | Henriksen | G06F 11/1464 |
| 9,235,848 B1 | 1/2016 | Gourley et al. | |
| 2002/0087632 A1 | 7/2002 | Keskar | |
| 2002/0104087 A1 | 8/2002 | Schaffer et al. | |
| 2002/0194018 A1 | 12/2002 | Scott | |
| 2003/0025720 A1 * | 2/2003 | Lau | G06Q 10/10 |
| | | | 715/700 |
| 2003/0093294 A1 | 5/2003 | Passantino | |
| 2003/0220913 A1 * | 11/2003 | Doganata | G06F 17/30867 |
| 2004/0015329 A1 | 1/2004 | Shayegan et al. | |
| 2004/0024739 A1 | 2/2004 | Cooperman et al. | |
| 2004/0039814 A1 | 2/2004 | Crabtree et al. | |
| 2004/0073918 A1 | 4/2004 | Ferman et al. | |
| 2004/0128301 A1 | 7/2004 | Thint et al. | |
| 2005/0050227 A1 | 3/2005 | Michelman | |
| 2005/0076365 A1 | 4/2005 | Popov et al. | |
| 2005/0154701 A1 | 7/2005 | Parunak et al. | |
| 2005/0182743 A1 | 8/2005 | Koenig | |
| 2005/0216457 A1 | 9/2005 | Walther et al. | |
| 2005/0240580 A1 | 10/2005 | Zamir et al. | |
| 2006/0085373 A1 | 4/2006 | Dhillion et al. | |
| 2006/0136589 A1 | 6/2006 | Konig et al. | |
| 2006/0179112 A1 | 8/2006 | Weyer et al. | |
| 2006/0200432 A1 | 9/2006 | Flinn et al. | |
| 2006/0200434 A1 | 9/2006 | Flinn et al. | |
| 2006/0282304 A1 * | 12/2006 | Bedard | G06Q 30/02 |
| | | | 705/7.33 |
| 2006/0294085 A1 | 12/2006 | Rose et al. | |
| 2007/0016553 A1 | 1/2007 | Dumais et al. | |
| 2007/0043720 A1 * | 2/2007 | Koenig | G06Q 30/02 |
| 2007/0060109 A1 | 3/2007 | Ramer et al. | |
| 2007/0143281 A1 | 6/2007 | Smirin et al. | |
| 2007/0162355 A1 | 7/2007 | Tabin | |
| 2007/0203790 A1 | 8/2007 | Torrens et al. | |
| 2007/0239610 A1 | 10/2007 | Lemelson | |
| 2007/0277093 A1 | 11/2007 | Joshi et al. | |
| 2007/0300174 A1 | 12/2007 | Macbeth et al. | |
| 2008/0005075 A1 | 1/2008 | Horvitz et al. | |
| 2008/0005103 A1 | 1/2008 | Ratcliffe et al. | |
| 2008/0046555 A1 | 2/2008 | Datta et al. | |
| 2008/0077461 A1 | 3/2008 | Glick | |
| 2008/0077574 A1 | 3/2008 | Gross | |
| 2008/0104004 A1 | 5/2008 | Brave et al. | |
| 2008/0104030 A1 | 5/2008 | Choi et al. | |
| 2008/0208852 A1 | 8/2008 | Kuttikkad et al. | |
| 2008/0209350 A1 | 8/2008 | Sobotka et al. | |
| 2008/0215623 A1 | 9/2008 | Ramer et al. | |
| 2008/0243827 A1 | 10/2008 | Sarma et al. | |
| 2008/0288494 A1 | 11/2008 | Brogger et al. | |
| 2008/0288573 A1 | 11/2008 | Bellotti et al. | |
| 2008/0294607 A1 | 11/2008 | Partovi et al. | |
| 2009/0018851 A1 | 1/2009 | Greenfield | |
| 2009/0031030 A1 | 1/2009 | Schmidt | |
| 2009/0089751 A1 | 4/2009 | Raikes et al. | |
| 2009/0100047 A1 * | 4/2009 | Jones | G06F 17/30648 |
| 2009/0112837 A1 | 4/2009 | Modani et al. | |
| 2009/0163183 A1 * | 6/2009 | O'Donoghue | G06Q 30/02 |
| | | | 455/414.1 |
| 2009/0164450 A1 | 6/2009 | Martinez et al. | |
| 2009/0254838 A1 | 10/2009 | Rao et al. | |
| 2009/0276368 A1 * | 11/2009 | Martin | G06Q 40/02 |
| | | | 705/36 R |
| 2009/0299812 A1 | 12/2009 | Ray | |
| 2010/0005411 A1 | 1/2010 | Duncker et al. | |
| 2010/0030764 A1 | 2/2010 | Koren | |
| 2010/0105315 A1 | 4/2010 | Albrett | |
| 2010/0106668 A1 | 4/2010 | Hawthorne et al. | |
| 2010/0145937 A1 | 6/2010 | Davis et al. | |
| 2010/0169148 A1 | 7/2010 | Oberhofer et al. | |
| 2010/0198869 A1 | 8/2010 | Kalaboukis et al. | |
| 2010/0205541 A1 | 8/2010 | Rapaport et al. | |
| 2010/0250341 A1 | 9/2010 | Hauser | |
| 2010/0250578 A1 | 9/2010 | Athsani et al. | |
| 2010/0287033 A1 | 11/2010 | Mathur | |
| 2011/0113094 A1 * | 5/2011 | Chunilal | G06F 17/30867 |
| | | | 709/204 |
| 2011/0162038 A1 | 6/2011 | Chunilal | |
| 2011/0184960 A1 | 7/2011 | Delpha et al. | |
| 2011/0191311 A1 * | 8/2011 | Polonsky | G06F 16/00 |
| | | | 707/706 |
| 2011/0231488 A1 | 9/2011 | Xu | |
| 2011/0295612 A1 | 12/2011 | Donneau-Golencer et al. | |
| 2011/0307478 A1 | 12/2011 | Pinckney et al. | |
| 2012/0030553 A1 | 2/2012 | Delpha et al. | |
| 2012/0036523 A1 | 2/2012 | Weintraub et al. | |
| 2012/0054022 A1 * | 3/2012 | Kosashvili | G06F 17/30867 |
| | | | 705/14.43 |
| 2012/0089623 A1 * | 4/2012 | Sobotka | G06F 3/0482 |
| | | | 707/751 |
| 2012/0110463 A1 * | 5/2012 | Brolley | G06Q 30/0282 |
| | | | 715/738 |
| 2012/0143911 A1 | 6/2012 | Liebald et al. | |
| 2012/0150972 A1 | 6/2012 | Morris et al. | |
| 2012/0197813 A1 | 8/2012 | Kurtzig et al. | |
| 2012/0272164 A1 | 10/2012 | Polonsky et al. | |
| 2012/0311139 A1 | 12/2012 | Brave et al. | |
| 2012/0316940 A1 | 12/2012 | Moshfeghi | |
| 2012/0331052 A1 | 12/2012 | Rathod | |
| 2013/0073473 A1 | 3/2013 | Heath | |
| 2013/0073568 A1 | 3/2013 | Federov et al. | |
| 2013/0096937 A1 | 4/2013 | Campbell et al. | |

(56) References Cited

U.S. PATENT DOCUMENTS

| | | |
|---|---|---|
| 2013/0097246 A1 | 4/2013 | Zifroni et al. |
| 2013/0124449 A1 | 5/2013 | Pinckney et al. |
| 2013/0159325 A1 | 6/2013 | Polonsky et al. |
| 2013/0166346 A1 | 6/2013 | Al-Zuhair et al. |
| 2014/0006372 A1 | 1/2014 | Ickman et al. |
| 2014/0038725 A1 | 2/2014 | Mizrahi et al. |
| 2014/0074824 A1 | 3/2014 | Rad et al. |
| 2014/0344855 A1* | 11/2014 | Morrow ............ H04N 21/2668 725/34 |
| 2015/0046435 A1 | 2/2015 | Donneau-Golencer |

* cited by examiner

METHODS AND SYSTEMS FOR IMPROVING ENGAGEMENT WITH A RECOMMENDATION ENGINE THAT RECOMMENDS ITEMS, PEERS, AND SERVICES

This application claims the benefit of U.S. provisional patent application No. 61/772,764 filed on Mar. 5, 2013, which is incorporated herein and made a part hereof by reference.

BACKGROUND OF THE INVENTION

The present invention provides enhancements for computerized item, service and peer recommendation systems directed toward industry professionals, and corresponding methods. In particular, the present invention relates to methods and systems for improving engagement with a recommendation engine that recommends items, peers, and services. The present invention is applicable to other situations involving non industry professionals as well.

Recommendation systems typically maintain (i) a database of declared/explicit profiles of professionals, and (ii) a history of actions taken by professionals within a given field of expertise, and use the combination of (i) and (ii) to recommend, for example, items or peers or additional services. The item recommendations can include, for example, documents to be reviewed, news items and industry announcements, events to attend, search keywords that may be of interest, and the like. A key purpose of the recommendations is to increase engagement between the industry professionals and the entity providing the recommendations by maximizing the value of the recommendations to the end-user (the industry professional).

In addition, various tools for maintaining documentation in various fields are known in the art. For example, U.S. Pat. No. 7,035,838 to Nelson et al. discloses methods and systems for organizing information stored within a computer network-based system. Documentation relating to a plurality of topics and a list of experts on a plurality of topics is stored in a centralized database. A user interface enables a user to search the database for a specific item of information by at least one of a work function, a functional category and a community.

Prior art systems such as those referred to above generally rely on either (i) the user entering information and proactively maintaining and updating the relevance of that information, or (ii) taking actions that can be recorded. Such limitations compromises the ability to provide relevant recommendations to users that do not maintain a certain engagement threshold with the system and either (i) do not enter or maintain information and/or (ii) do not take frequent actions. This is a known challenge for any recommendation engine application, and in particular, those with smaller industry specific target audiences where it is impossible to predict the user's profile if their engagement with the system is below such a threshold (due to insufficient statistics). As a result, such prior art recommendation engines may provide a broad spectrum of marginally relevant choices of information, which can be overwhelming. In turn, there is little likelihood that the provided recommendations will break the cycle of disengagement by providing relevant information for the least engaged users.

It would be advantageous to provide improved apparatus and methods for obtaining relevant information that can assist a user in staying current in a profession and/or can assist in solving a business or technical problem. It would be further advantageous to provide such a system that presents highly relevant information to individual users without relying on them (i) explicitly feeding information to an underlying profile and/or (ii) implicitly doing so by interacting with relevant items, peers or services on a consistent basis.

The methods and systems of the present invention provide the foregoing and other advantages. For example, the present invention provides a third source of information for use by a recommendation engine, a passive profile underlying the typical profiles used by a recommendation engine, as well as additional sources of information, for use by the recommendation engine. The present invention does not require the user to take action or enter information in order to receive highly relevant recommendations. In particular, the present invention provides methods and systems for accelerating engagement in least engaged user segments.

SUMMARY OF THE INVENTION

The present invention relates to computerized methods and systems for improving engagement with a recommendation engine that recommends items, peers, and services.

An example embodiment of a method in accordance with the present invention may comprise electronically accessing stored data of a plurality of users, analyzing the stored data of each of the users, determining a respective passive profile for each of the users based on the analyzing of the stored data, storing the respective passive profiles for use by the recommendation engine, and providing recommendations for at least one of items, peers, and services to a respective user based on at least the respective passive profile.

The recommendations may be further based on at least one of an explicit profile comprising information provided by the respective user and an activity profile based on tracked activity of the respective user. The tracked activity of the user may relate to at least one of recommended items reviewed, keyword searches entered, peers interacted with, items purchased, online discussions participated in, documents opened, items downloaded, virtual events attended, and the like. The recommendations may be further based on one or more of the passive profiles of other of the users which are similar to the respective passive profile.

The method may further comprise tracking at least one of the respective user's interaction with the user's stored data and changes made to the stored data, and maintaining a passive interaction profile for each respective user based on the tracking. In addition, the method may also include at least one of: periodically updating the respective passive interaction profiles for the users based on the tracking; and using the passive interaction profiles to improve the recommendations.

The recommendations can be provided for a wide range of items, goods or services, including but not limited to recommendations for at least one of experts, documents, articles, news items, announcements, charts, graphics, reports, web pages, events to attend, keyword searches, software updates, additional software programs, additional hardware, software information items, hardware information items, or appropriate services based on at least one of the respective passive profile and the respective passive interaction profile.

The method may further comprise providing a mapping tool for mapping information obtained from the stored data to the respective passive profiles and for mapping information obtained from the tracking to the respective passive interaction profiles. The information contained in the passive profiles and the passive interaction profiles may be filtered for use in the providing of the recommendations.

For example, a cluster filter may be applied to the passive profile and the passive interaction profile for: identifying users having similar passive profiles and passive interaction profiles; grouping the identified users with similar passive profiles and passive interaction profiles into clusters and storing the clusters in a cluster database; locating at least one of the items, peers, or services associated with a keyword provided by a respective user and also used by other users in the same cluster as the respective user; and returning at least one of the items, peers, or services to the respective user.

A collaborative filter may be applied to at least one of the passive interaction profile and the cluster database for: identifying other users having similar passive profiles and passive interaction profiles; grouping the identified users with similar passive profiles and passive interaction profiles into peer groups and storing the peer groups for each respective user in a peer database; scoring each of the identified other users based on how well the passive profile and the passive interaction profile of the respective user matches the passive profiles and the passive interaction profiles of the other users; locating at least one of items, peers, or services used by a best-matching subset of the indentified users based on the scoring; and returning at least one of the items, peers, or services to the respective user.

A search engine may be used to return the at least one of items, peers, and services to the respective user based on a keyword search of the respective user. The search engine may locate the at least one of items, peers, and services from the other users that are not in the respective user's cluster or peer group.

The method may further comprise applying a sorting algorithm for sorting the at least one of the items, peers, and services returned by the cluster filter, the collaborative filter, and the search engine. The at least one of the items, peers, and services may be scored by weights assigned to each of the cluster filter, the collaborative filter, and the search engine. The at least one of the items, peers, and services returned by the cluster filter and the collaborative filter may be given precedent to the at least one of the items, peers, and services returned by the search engine.

In addition, the method may also comprise dynamically qualifying other users from the respective user's peer group as experts. The other users may be qualified as experts by: identifying overlaps between at least one of the passive profiles, passive interaction profiles, and peer interactions of the respective user and the other users in the peer group; scoring the overlaps for each of the other users based on an extent of the respective overlaps; and biasing the recommendations of experts based on the scoring.

In addition, the method may also comprise applying a peer searching algorithm for identifying other users as peers that at least one of: have keywords in their respective passive profiles that are the same as or are related to the keyword search; have explicit profiles comprising information provided by the other users that are related to the keyword search; and have passive interaction profiles that are related to the keyword search. The peers identified by the peer search algorithm and peers identified by the collaborative filtering algorithm may be sorted, with precedence given to the peers identified by the collaborative filtering algorithm over the peers identified by the peer search algorithm.

Alerts may be provided to the recommendation engine when changes to one of the passive profiles or the passive interaction profiles are detected. In such a case, a query for the respective user with keywords based on the detected change may be automatically constructed. At least one of recommended items, peers, and services returned by the query may then be provided to the respective user.

Other users having similar passive profiles to the passive profiles with the detected changes may be notified of the respective detected changes and the recommended items, peers, and services returned by the query. The notifying may include providing the identity of the user having the passive profile with the detected changes.

In addition, one or more of the passive profiles, passive interaction profiles, and detected changes may be aggregated to provide benchmarks for industry standards and for providing users with a comparison between at least one of (i) at least one element of their respective passive profiles and the relevant benchmark; and (ii) at least one element of their respective passive interaction profiles and the relevant benchmark.

The analyzing of the user's stored data may occur with a predetermined frequency in order to update each of the passive profiles. The stored data may relate to almost any type of stored data, including but not limited to at least one of inventory lists, data lists, business documentation, software applications, computer hardware data, electronic device data, entertainment inventory comprising at least one of songs, movies, and electronic books, and the like, travel data, household data, personal data, grocery lists, utility data, sports equipment listings, hobby data, automobile records, personal interests data, performance data pertaining to a machine or a device, or the like.

The present invention also encompasses a computerized system for improving engagement with a recommendation engine that recommends items, peers, and services. The system may comprise a network connecting a recommendation engine to a plurality of user devices (e.g., computers or other electronic devices), a software application for electronically accessing and analyzing data stored on the user devices and determining a respective passive profile for each of the users based on the analyzing of the stored data, and a database for storing the respective passive profiles for use by the recommendation engine. The recommendation engine may provide recommendations for at least one of items, peers, and services to the respective users based on at least the respective passive profile.

The system may include or enable additional features discussed above in connection with the various embodiments of the methods for improving engagement with a recommendation engine.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

In accordance with the present invention, computerized methods and systems for improving engagement with a recommendation engine that recommends items, peers, and services are provided.

Applicant's commonly-owned, co-pending U.S. patent application Ser. No. 13/528,029 entitled "Bimodal Recommendation Engine for Recommending Items and Peers", which is incorporated herein and made a part hereof by reference, discloses methods, apparatus and algorithms for recommending items and/or peers in response to keyword searches or user identifiers. Filters and algorithms are used to provide only the most relevant recommendations to the end user. In addition, Applicant's commonly-owned co-pending U.S. patent application Ser. No. 14/046,229 entitled "Methods and Systems for Modifying a User Profile For a Recommendation Algorithm and Making Recommendations Based on User Interactions With Items", which is incorporated herein and made a part hereof by reference, discloses methods and systems for modifying a user profile for a recommendation engine based on the tracking of a user's interaction with a recommended item. The present invention may be seen as an enhancement or outgrowth of application Ser. No. 13/528,029 and of U.S. application Ser. No. 14/046,229.

Figure 1:
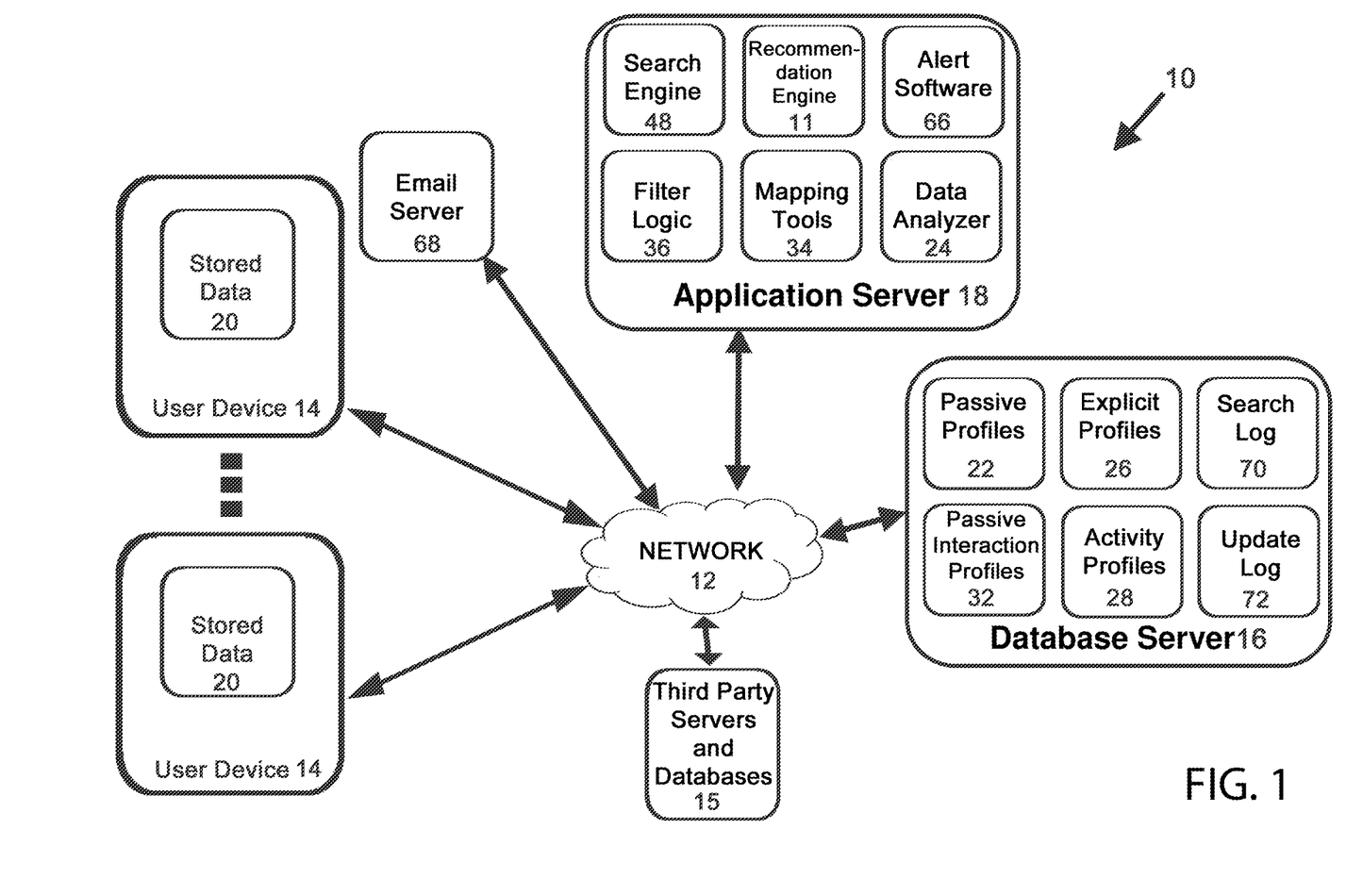
FIG. 1 shows a block diagram of an example embodiment of a system in accordance with the present invention.

The present invention enables passively building and maintaining current a profile that reflects the user's areas of activity and hence, of interest. FIG. 1 shows block diagram of an example embodiment of a system 10 in accordance with the present invention. As shown in FIG. 1, the system 10 may be implemented over a digital network 12. In one example embodiment of the present invention as shown in FIG. 1, a recommendation engine 11 may be in communication with one or more user devices 14 (e.g., a computer or other electronic device) over the network 12. A database server 16 may also be connected to the network 12 and comprise various databases for use by the recommendation engine 11, as explained in more detail below. An application server 18 may also be provided for serving various applications over the network 12 in accordance with the present invention, as explained in more detail below.

Although FIG. 1 shows the recommendation engine 11 contained within application server 18, those skilled in the art should appreciate that the recommendation engine 11 is, for example, embodied as a software application and can therefore reside on a separate application server or other computer component, as can the other applications (search engine 48, filter logic 36, data analyzer 24, alert software 66, and mapping tools 34 shown as part of application server 18). Similarly, the various profiles shown in FIG. 1 as part of database server 16 can reside in different locations and/or on different devices/servers. Likewise, the application server 18 and database server 16 may be integrated into one device, or separated into several different servers and/or databases.

In one example embodiment, the present invention may comprise electronically accessing stored data 20 of a plurality of users obtained from the users' device(s) 14, analyzing the stored data 20 of each of the users, determining a respective passive profile 22 for each of the users based on the analyzing of the stored data 20, storing the respective passive profiles 22 (e.g., at database server 16) for use by the recommendation engine 11, and providing recommendations 30 (shown in FIG. 2) for at least one of items, peers, and services to a respective user based on at least the respective passive profile 22. The stored data 20 on the user device(s) 14 may be accessed and analyzed by, for example, a data analyzer software application 24, which can, based on the analyzing of the stored data 20, determine the respective passive profiles 22 for each user.

Those skilled in the art should appreciate that the stored data 20 may be contained on any type of electronic device having a network connection or Internet connectivity, including but not limited to electronic storage devices, data servers, cellular telephones, tablet computers, internet enabled devices, or the like. Further, the invention may utilize stored data 20 obtained from more than one electronic device for each use (e.g., the passive profile may be determined from stored data obtained from a user's computer and from the user's smart phone (or other device)).

As shown in FIG. 1, the data analyzer software application 24 communicates with the user device 14 and records information on the device's environment (stored data 20) in the passive profile database 22 contained in the database server 16. Examples of such data analyzer software 24 may include software to record details of a hardware-stack in a datacenter managed by the user, software to record an application-stack running in such a datacenter, or in a more general industry example, software to translate any type of inventory or images of such inventory managed and/or operated by the user, software to cull keywords from data files or documents, or the like. This data (or details relating to this data) may comprise the passive profile 22 for the user. Thus, the present invention advantageously leverages the fact that a user's professional interests are reflected by the hardware or software stack or type of inventory (e.g., collectively the stored data 20) that they maintain or manage.

It should be appreciated that the term "stack" as used herein (whether used in conjunction with "hardware-stack", "application-stack" or otherwise) refers to any type of stored data 20, including but not limited to data pertaining to inventory, inventory listing, data lists, business documentation, software applications, computer hardware data, or other data or lists, maintained by a user in the course of their business.

It should also be appreciated that although the present invention is described in connection with business professionals, it can easily be extended outside of the business area and be applied to individuals for recommendations of items, peers, and services related to the user's daily life, recreation, or leisure pursuits. For example, in such an implementation, the stored data 20 in question may encompass entertainment inventory comprising at least one of songs, movies, and electronic books stored on the user's computer, an inventory of appliances and electronic devices recorded in a database, travel data, household data, personal data, grocery lists, utility data, sports equipment listings, hobby data, automobile records, personal interests data, performance data pertaining to a machine or a device, or the like. The recommendations 30 may relate thereto (e.g., new songs or movies that may be of interest, or suggested upgrades and software patches to personal electronic devices).

In accordance with an example embodiment of the present invention, the recommendation engine 11 may use a combination of the passive profile 22 and any explicit profile 26 (information entered directly by the user) and/or an activity profile 28 (information based on tracked or recorded user activity patterns with regard to prior recommended items), in order to recommend the best items, peers, and/or services to a querying user (also referred to as a "requester", "respective user", or "target user"). The passive profile 22 discussed herein is, however, independent of explicit profiles 26 and activity profiles 28 and need not be used in conjunction therewith in a recommendation engine 11. The recommendations 30 may be further based on one or more of the passive profiles 22 of other of the users which are similar to the respective passive profile 22 of the querying user.

Figure 2:
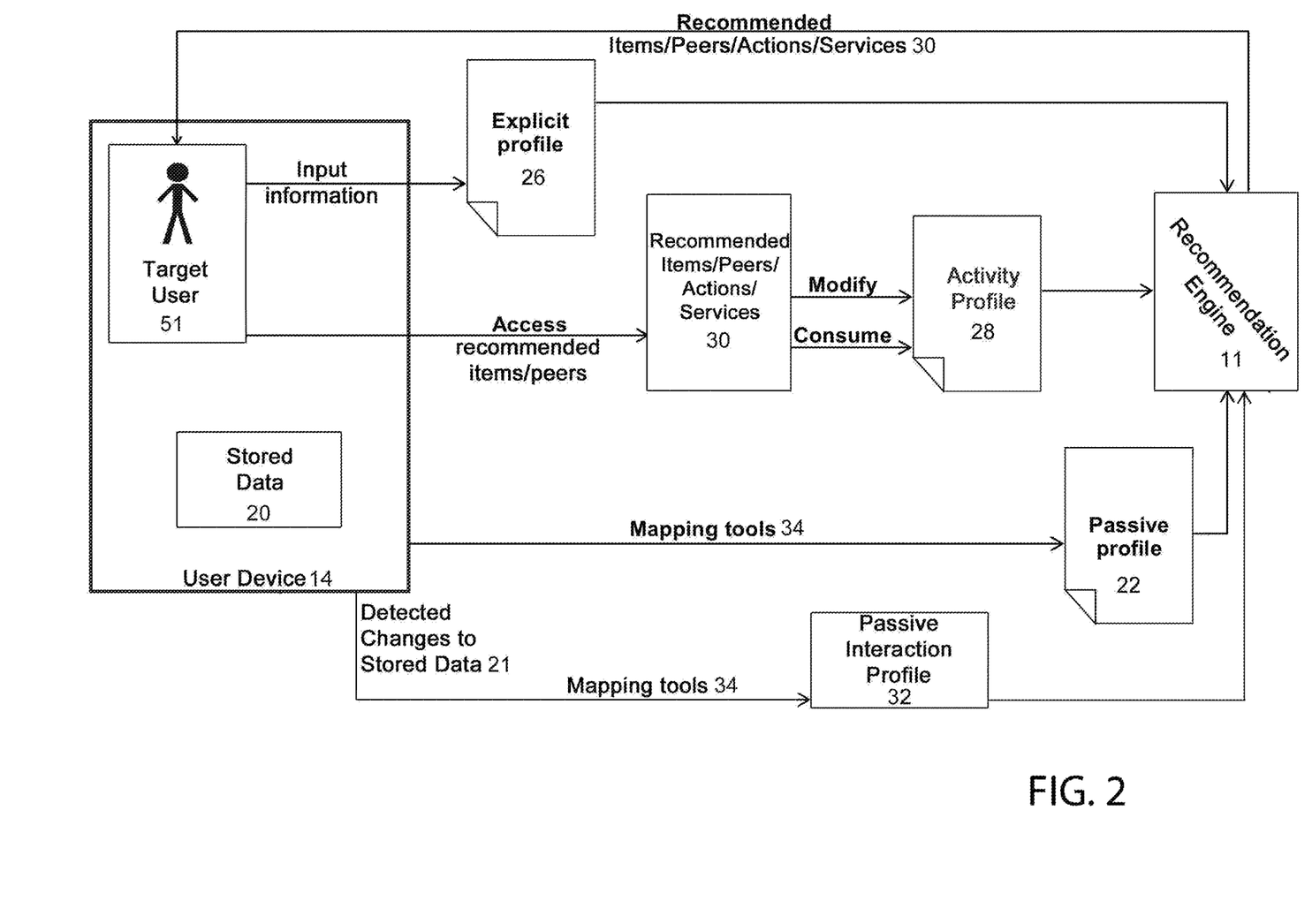
FIG. 2 shows a block diagram illustrating the collection of data and creation of various user profiles in accordance with an example embodiment of the present invention.

FIG. 2 shows an example block diagram of the collection of data (stored data 20 or detected changes to stored data 21, such as information obtained from the tracking of user interaction with or manipulation of the stored data 20) from the user and the use of four different profile types that may be used in a recommendation engine 11 in accordance with example embodiments of the present invention: an explicit profile 26 entered directly by a user 51; an activity profile 28 obtained from tracking of a user's activity (e.g., recommended items they have accessed, modified, and/or consumed, keyword searches entered, Internet sites they have visited, peers they have interacted with, items they have purchased, online discussions participated in, and the like); a passive profile 22 obtained from analysis of the user's inventory/stored data 20; and a passive interaction profile 32 obtained from a user's interaction with or modifications to the stored data (described in more detail below).

Recommended items 30 (documents, articles, links to documents, news items, announcements, charts, graphics, reports, web pages, events to attend, keyword searches, and the like) and recommended actions 30 (equipment to purchase, maintenance to perform, software applications to upgrade, software patches to deploy, known issues to mitigate, and the like) can be provided by the recommendation engine 11 based on one or more of the profile types. Recommendations 30 on peers or experts to interact with and services to obtain can also be provided. The recommended items may be provided to the recommendation system 10 by or obtained by the recommendation system 10 from third party servers and databases 15, from profiles of other users, or from benchmarks based on such profiles.

The system may be used to verify a user need to receive information updates on specific hardware components or software programs based on their stored data 20 and any other actions they took with regard to the stored data that were tracked or recorded by the system. The data analyzer software 24 may detect any changes to the users stored data 20 (e.g., when periodically accessing and analyzing the stored data 20). A separate passive interaction profile 32 may be created (e.g., by the data analyzer 24) and maintained (e.g., on the database server 16) to capture actual actions taken, modifications to, or interactions with, the stored data 20 by the user or others working with the user. This passive interaction profile 32 is different from the activity profile 28 discussed above, which maintains a record of activity related to the users actions with regard to the recommending entity, the provided recommendations, or the user's online activity in general. For the passive interaction profile 32, the activities or actions taken with regard to the stored data 20 may include, for example, changes to documents, inventory listings, data files or other stored records, adding or changing files, adding or deleting photos, songs, movies, electronic books or other entertainment information, software updates performed, additional software installed, additional hardware installed, related maintenance and services performed, or changes to any other type of data or stored information contained on an electronic device 14. Such a passive interaction profile 32 may be periodically updated based on the tracking of activity, and be used to improve or provide the recommendations 30. For example, recommendations 30 for at least one of software updates, additional software programs, additional hardware, software information items, hardware information items, or appropriate services can be provided based on at least one of the respective passive profile 22 and the passive interaction profile 32.

As shown in FIG. 2, a mapping tool 34 may be used to feed the stored data 20 (or details regarding the stored data 20) obtained from the data analyzer 24, or detected changes to stored data 21 (information obtained from the tracking of user interaction with or manipulation of the stored data 20) obtained from the data analyzer 24, to either a passive profile 22 or a passive interaction profile 32 of the recommendation system 10.

Figure 3:
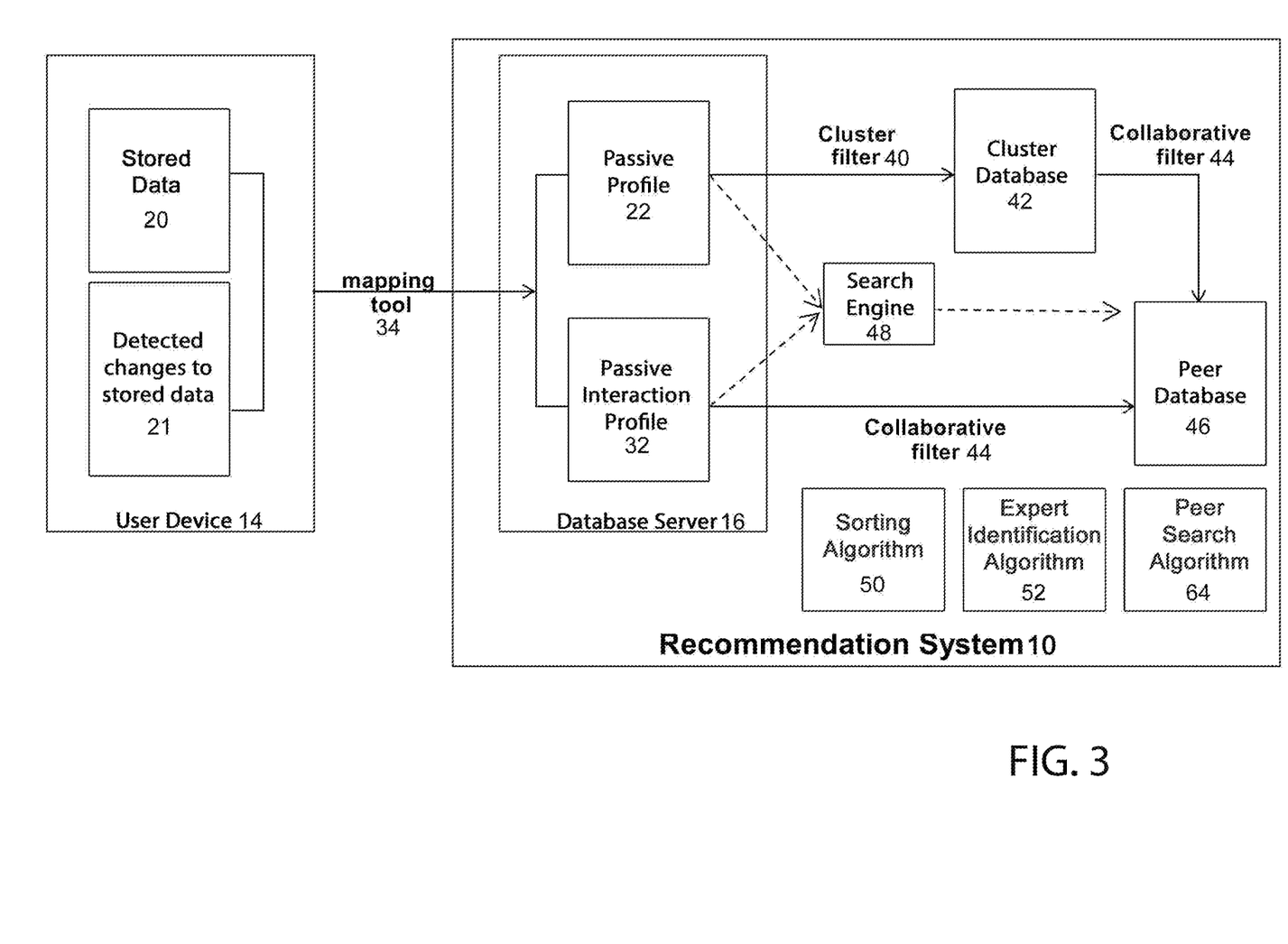
FIG. 3 shows a block diagram illustrating an example application of various filters used in an example embodiment of the present invention.

As shown in FIG. 3, filters (e.g., software applications and/or algorithms shown collectively as filter logic 36 in FIG. 1) may then be applied to the passive profiles 22 and/or the passive interaction profiles 32 to provide better recommendations, as described in detail below. For example, a cluster filtering algorithm (also referred to herein as "cluster filter") 40 may also be provided and applied to each user's passive profile 22 and passive interaction profile 32 in order to create clusters of target users with similar passive profiles 22 and passive interaction profiles 32. The cluster filtering algorithm 40 may:

(i) identify clusters of users having similar passive profiles 22 and similar passive interaction profiles 32, wherein users having similar passive profiles 22 and similar passive interaction profiles 32 will be grouped together in the same cluster, (ii) store the clusters in a cluster database 42;

(iii) locate other users who belong to the same cluster as the target user, (iv) locate items, peers, and/or services associated with a keyword provided by the querying or target user and used by the other users in the same cluster, and (v) return the items, peers, and/or services, as well as action details located, for consideration by the querying or target user.

A collaborative filtering algorithm (also referred to herein as "collaborative filter") 44 may also be provided and applied to the passive interaction profile 32 and/or the cluster database 42 in order to identify other users having passive profiles 22 and passive interaction profiles 32 that are similar to the passive profiles 22 and passive interaction profiles 32 of the target user. The collaborative filtering algorithm 44 may:

(a) locate other users in the databases based on the similarity between the passive profiles 22 and passive interaction profiles 32 of the target user and the other users (the collaborative filtering algorithm 44 may also consider (i) explicit profiles 26 and (ii) implicit activity profiles 28), (b) group the identified users with similar passive profiles 22 and passive interaction profiles 32 into peer groups and store the peer groups for each respective user in a peer database 46;

(c) determine scores of the other users located in step (a) indicative of how well the passive profile 22 and the passive interaction profile 32 of the respective user matches the passive profiles 22 and the passive interaction profiles 32 of the other users, (d) locate at least one of items, peers, and/or services used by a best matching subset of the other identified users located in step (a) based on the scores calculated in step (c), and (e) return the items, peers, and/or services located in step (d) for consideration by the target user.

A search engine 48 may be provided for returning items, peers, and/or services to the target user based on any keyword search of the user. The search engine 48 may search and locate items, peers, and/or services from other users that may not be in the target's user filtered cluster 42 or peer group 46 but may be relevant for a particular query or keyword or other marker used. A sorting algorithm 50 (which, for example, may be included in the filter logic 36 of FIG. 1) may also be provided and applied for sorting the items, peers, and/or services returned by the collaborative filtering algorithm 44, the cluster filtering algorithm 40, and the search engine 48. These items, peers, and/or services may be scored by applying weights assigned to each of the cluster filter 40, the collaborative filter 44, and the search engine 48. The sorting algorithm 50 may give precedence to items, peers, and/or services returned by the collaborative filter 44 and the cluster filter 40 over items, peers, or services returned by the search engine 48.

Figure 4:
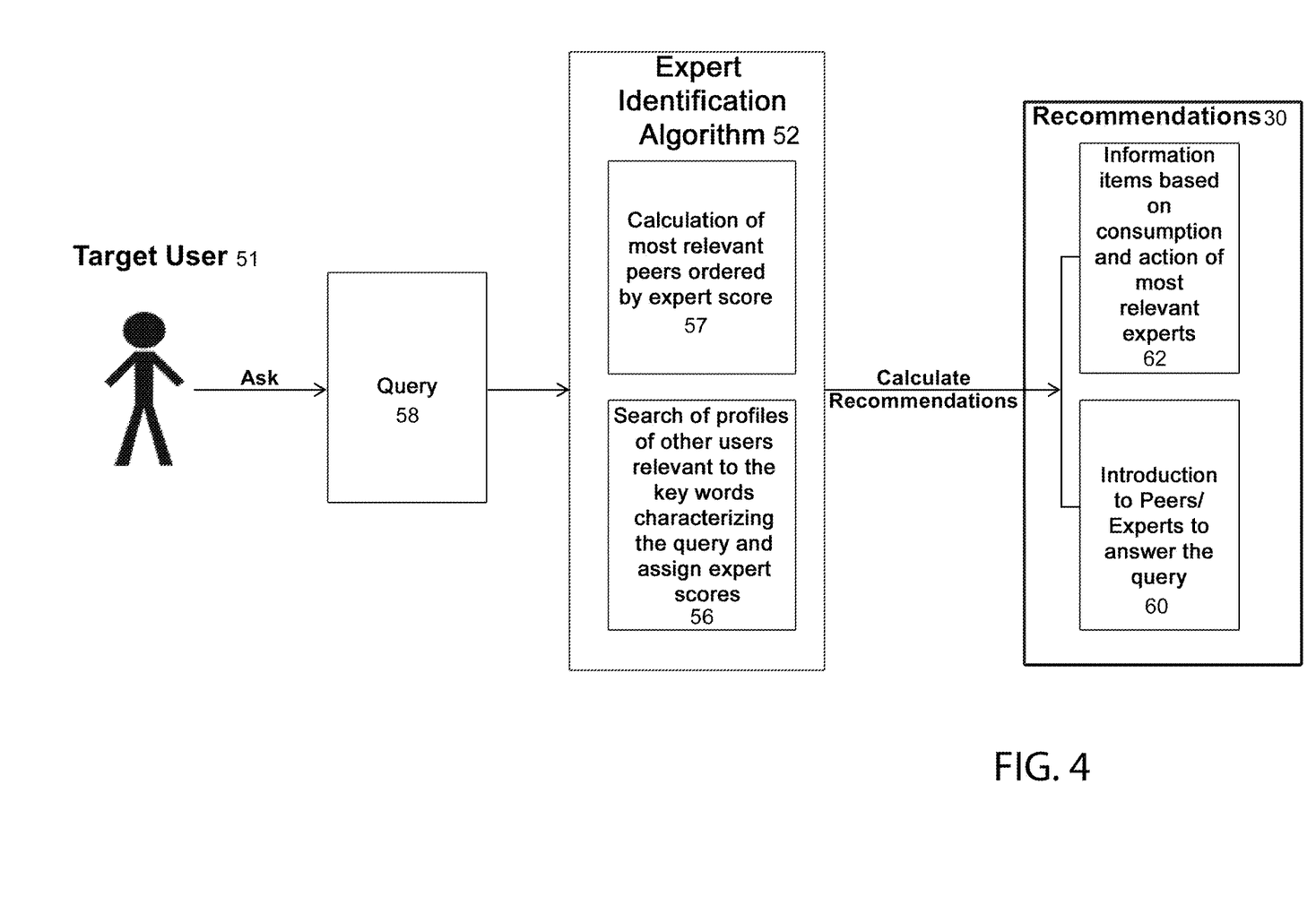
FIG. 4 shows a block diagram illustrating an example embodiment for the qualifying of experts in accordance with the present invention.

A dynamic expert identification algorithm 52 (which, for example, may be included in the filter logic 36 of FIG. 1) may be associated with the collaborative filtering algorithm 44. This dynamic expert identification algorithm 52 is adapted to dynamically qualify other users from the respective user's peer group as experts, in order to maximize the relevancy of any peer or social recommendations. As shown in FIG. 4, the qualifications of the users as experts relative to the target user 51 are calculated dynamically by the dynamic expert algorithm 52 that objectively indentifies and scores overlaps across all available profiles between two users, overlaps between recency of similar actions recorded in the corresponding passive interaction profiles, and overlaps and similarities between past peer interactions the two users conducted 56. An expert score 57 is calculated based on the extent of the overlaps, which scores are used to bias recommendations. In an example embodiment, a target user 51 is also a querying user and he or she submits a query 58 (e.g., questions or keyword searches) to the recommendation system 10. The system then calculates expert scores 57 as described above, calculates peer recommendations based on the query 58, and biases the peer recommendations so that the recommendations are ordered both by relevancy and by expert scores. The target user 51 then receives a list of peers to contact 60 and/or the peers receive directly the query and are asked to respond to the querying user 51. Information items or services 62 may also be provided based on items consumed and actions taken by the most relevant experts determined by the system. An example of an expert recommendation system is disclosed in Applicant's commonly-owned, co-pending U.S. patent application Ser. No. 13/532,936 entitled "Interactive Peer Directory with Question Router", which is incorporated herein and made a part hereof by reference. The passive profile 22 and the passive interaction profile 32 of the present invention can be used to enhance the expert recommendations provided by the system of application Ser. No. 13/532,936.

A peer search algorithm 64 (which, for example, may be included in the filter logic 36 of FIG. 1) can be provided for identifying other users as peers that have at least one of: keywords in their respective passive profiles 22 that are the same as or are related to the keyword search; explicit profiles 26 comprising information provided by the other users that are related to the keyword search; and passive interaction profiles 32 that are related to the keyword search. In such an example embodiment, the collaborative filtering algorithm 44 returns peer matches as discussed above. The sorting algorithm 50 is used to sort the peers identified by the peer search algorithm 64 and peers identified by the collaborative filtering algorithm 44. The sorting algorithm 50 gives precedence to peers returned by the collaborative filtering algorithm 44 over peers located by the peer search algorithm 64. In such example embodiments, peers who have higher expert scores from the dynamic expert identification algorithm 52 are ranked higher compared to other peers identified using the peer search algorithm 64.

In another example embodiment, peers returned by the collaborative filtering algorithm 44 that are not also returned by the peer search algorithm 64 may not be presented to the querying user for consideration.

In a further example embodiment, an alert system is provided which provides alerts in response to any changes to a user's passive profile 22 or passive interaction profile 32. The alerts may be implemented by alert software 66 and email server 68 (see FIG. 1). Once the system 10 records a change, it alerts the recommendation engine 11 and automatically constructs a query based on keywords describing or related to the detected change, performs a search and identifies experts as described in the above example embodiments, and/or provides the target user 51 with relevant items, peers, or services returned by the query. In one example embodiment, such changes are tracked and all users with passive profiles 22 which are determined to be similar to that of the passive profile 22 of the user being tracked before he or she took action, are notified (e.g., via email from email server 68 or via a private message in the user's private portal for the recommendation services, or any other type of mobile notifications or electronic communication method customarily employed between providers and users) of any such change and of the recommended items, peers, or services returned by the query. The notification may include the identity of the user who experienced the change.

In addition, one or more of the passive profiles 22, passive interaction profiles 32, and detected changes 21 may be aggregated to provide benchmarks for industry standards and for providing users with a comparison between at least one of (i) at least one element of their respective passive profiles 22 and the relevant benchmark; and (ii) at least one element of their respective passive interaction profiles 32 and the relevant benchmark.

Information for the passive profile 22 and the passive interaction profile 32 can be collected from the stored data 20 and analyzed on a regular basis to enable the system 10 to update the passive profiles 22 and passive interaction profiles 32 and to optimize relevancy of any recommendations 30. The frequency of the collection and analyzing of the stored data 20 may be optimized to conform to a rate of change in a particular type of an environment.

Scores can be assigned to the users for particular keywords, providing an indication of the strength of the users with respect to the keywords.

The sorting algorithm 50 can be advantageously designed to give precedence to peers that have connected with the target user in the past.

It is also possible to assign peers to multiple clusters in the cluster database 42. In such an embodiment, the assignment of peers to multiple clusters can enable item recommendations using fuzzy clustering techniques.

The present invention also encompasses further example embodiments of a method for recommending items such as documents, events, search keywords and alert keywords to target users. For example, a search log 70 which captures search keywords entered and documents opened may be provided (e.g., maintained in database server 16 of FIG. 1).

A cluster that a target user belongs to is determined based on his or her passive profiles 22. Other users having profiles in the cluster database 42 who belong to the same cluster as the target user are located. Items such as documents may be located that are associated with a keyword provided by the target user and have been used by the other users in the same cluster. The items located on the basis of other users in the same cluster are then returned (i.e., presented to) the target user for consideration. Items other than or in addition to documents can also be returned, depending on the implementation. For example, events attended by other users in the cluster could be presented to the target user for consideration and possible attendance in the future. In another example, software updates recorded in passive interaction profiles 32 of other users in the same cluster can be presented for consideration if not yet recorded in the target user passive interaction profile 32 or if the user has only a passive profile 22, but not a passive interaction profile 32.

Other users having profiles in the database that are similar to the profile of the target user may also be located The similarity among the profiles can be determined, for example, based on at least one of (i) explicit profiles 26, (ii) activity profiles 28, (iii) passive profiles 22, (iv) or passive interaction profiles 32. Other relevant users can also be located based on those who have the most expertise for the keyword if provided by the target user or by the above-described alert system. Scores of the other users located can be determined, which scores are indicative of how well the other users match the target user. Based on these scores, items are located that have been used (e.g., document read) or actions performed (e.g., change in passive interaction profile) by a best matching subset of the other users located. The items located on the basis of the best matching subset of the other users are then returned for potential consideration by the target user.

The search log 70 may include identifications of items used (i.e., documents read or downloaded, events attended, items purchased, and the like) by users, on a per user basis. This log 70 can be used to improve future recommendations of items to target and querying users.

An update log 72 can be maintained (e.g., in database server 16 of FIG. 1) in which identifications of passive updates to a user's passive profiles 22 and passive interaction profiles 32 are captured and stored on a per user basis. This log 72 can be used to improve future recommendations of items to target users.

Peer matches can be returned to a target user based on other users whose explicit and/or implicit profiles indicate they have expertise in the keyword provided by the querying user and/or whose explicit profiles contains a match for an expertise such as one or more of a subject expertise, vendor expertise, or product expertise provided by the querying user and/or whose passive profiles contains a match for vendor, product, or other related items provided by the querying user and/or that their dynamic expert score passes a certain relevancy threshold and/or any combination of the above.

The database server 16 may also maintain data that is indicative of which other users a target or querying user has previously connected with as a peer. Data can also be maintained that is indicative of which users were the basis for the recommendation of items a querying user has previously used or changes they performed. Precedence can then be given to items located based on the other users indicated by the maintained data.

It should now be appreciated that the present invention provides advantageous methods and apparatus for improving user engagement with a recommendation engine by developing and maintaining a passive user profile from a user's stored data.

Although the invention has been described in connection with various illustrated embodiments, numerous modifications and adaptations may be made thereto without departing from the spirit and scope of the invention as set forth in the claims.

What is claimed is:

1. A computerized method for improving engagement with a recommendation engine that recommends items, peers, and services, comprising:
providing a remote server with access to user devices of a plurality of users;
remotely electronically accessing stored data of the plurality of users via the remote server over a digital communications network, the stored data being located on two or more of the user devices of each of the users;
automatically analyzing the stored data of each of the users using a data analyzer resident on the remote server to obtain information pertaining to the stored data;
automatically creating a respective passive profile for each of the users using a mapping tool associated with the data analyzer which maps the information obtained from the analyzing of the stored data into newly determined keywords associated with the stored data;
storing the respective passive profiles in a database associated with the recommendation engine for use by the recommendation engine;
automatically providing recommendations from the recommendation engine to a respective user based on at least the respective passive profile, the recommendations comprising at least one of recommended items, peers, and services;
tracking the users' interactions with the stored data and changes made to the stored data;
periodically automatically updating the respective passive profiles for the users based on the tracking;
enabling alerts to be provided to the recommendation engine when changes to the passive profiles are detected based on the updating;
automatically constructing a query for the respective user with keywords based on the detected changes; and
providing additional recommendations comprising at least one of additional recommended items, peers, and services returned by the query to the respective user;
wherein:
the stored data comprises at least software applications, computer hardware data, and electronic device data resident on the user devices, and
the passive profiles are automatically created and updated without user input once access to the user devices is provided.

2. The method in accordance with claim 1, wherein:
the recommendations are further based on at least one of an explicit profile comprising information provided by the respective user and an activity profile based on tracked activity of the respective user;
the tracked activity of the user relates to at least one of recommended items reviewed, keyword searches entered, peers interacted with, items purchased, online discussions participated in, documents opened, items downloaded, and virtual events attended.

3. The method in accordance with claim 1, wherein the recommendations are further based on one or more of the passive profiles of other of the users which are similar to the respective passive profile.

4. The method in accordance with claim 1, further comprising:
maintaining a passive interaction profile for each respective user based on said tracking.

5. The method in accordance with claim 4, further comprising at least one of:
periodically updating the respective passive interaction profiles for the users based on the tracking; and
using the passive interaction profiles to improve the recommendations.

6. The method in accordance with claim 4, further comprising:
providing recommendations for at least one of experts, documents, articles, news items, announcements, charts, graphics, reports, web pages, events to attend, keyword searches, software updates, additional software programs, additional hardware, software information items, hardware information items, or appropriate services based on at least one of the respective passive profile and said passive interaction profile.

7. The method in accordance with claim 4, wherein:
the mapping tool also maps information obtained from said tracking to the respective passive interaction profiles; and
further comprising filtering the information contained in the passive profiles and the passive interaction profiles for use in the providing of the recommendations.

8. The method in accordance with claim 7, further comprising:
applying a cluster filter to the passive profiles and the passive interaction profiles for:
identifying users having similar passive profiles and passive interaction profiles;
grouping the identified users with similar passive profiles and passive interaction profiles into clusters and storing the clusters in a cluster database;
locating at least one of the items, peers, or services associated with a keyword provided by a respective user and also used by other users in the same cluster as the respective user; and
returning at least one of the items, peers, or services to the respective user.

9. The method in accordance with claim 8, further comprising:
applying a collaborative filter to at least one of the passive interaction profile and the cluster database for:
identifying other users having similar passive profiles and passive interaction profiles;
grouping the identified users with similar passive profiles and passive interaction profiles into peer groups and storing the peer groups for each respective user in a peer database;
scoring each of the identified other users based on how well the passive profile and the passive interaction profile of the respective user matches the passive profiles and the passive interaction profiles of the other users;
locating at least one of items, peers, or services used by a best-matching subset of the identified users based on said scoring; and
returning at least one of the items, peers, or services to the respective user.

10. The method in accordance with claim 9, wherein:
a search engine is used to return the at least one of items, peers, and services to the respective user based on a keyword search of the respective user; and
the search engine locates the at least one of items, peers, and services from the other users that are not in the respective user's cluster or peer group.

11. The method in accordance with claim 10, further comprising:
applying a sorting algorithm for sorting the at least one of the items, peers, and services returned by the cluster filter, the collaborative filter, and the search engine;
scoring the at least one of the items, peers, and services by weights assigned to each of the cluster filter, the collaborative filter, and the search engine;
wherein the at least one of the items, peers, and services returned by the cluster filter and the collaborative filter are given precedent to the at least one of the items, peers, and services returned by the search engine.

12. The method in accordance with claim 9, further comprising:
dynamically qualifying other users from the respective user's peer group as experts.

13. The method in accordance with claim 12, wherein:
the other users are qualified as experts by:
identifying overlaps between at least one of the passive profiles, passive interaction profiles, and peer interactions of the respective user and the other users in the peer group;
scoring the overlaps for each of the other users based on an extent of the respective overlaps; and
biasing the recommendations of experts based on the scoring.

14. The method in accordance with claim 9, further comprising:
applying a peer searching algorithm for identifying other users as peers that at least one of: have keywords in their respective passive profiles that are the same as or are related to the keyword search; have explicit profiles comprising information provided by the other users that are related to the keyword search; and have passive interaction profiles that are related to the keyword search;
sorting the peers identified by the peer search algorithm and peers identified by the collaborative filtering algorithm, giving precedence to the peers identified by the collaborative filtering algorithm over the peers identified by the peer search algorithm.

15. The method in accordance with claim 4, wherein:
the alerts are also provided to the recommendation engine when changes to the passive interaction profiles are detected;
keywords based on the detected changes to the passive interaction profiles are also used in automatically constructing the query.

16. The method in accordance with claim 1, further comprising:
notifying other users having similar passive profiles to the passive profiles with the detected changes of the respective detected changes and the recommended items, peers, and services returned by the query.

17. The method in accordance with claim 16, wherein the notifying includes providing the identity of the user having the passive profile with the detected changes.

18. The method in accordance with claim 4, further comprising:

aggregating at least one of all passive profiles, all passive interaction profiles, and all detected changes to provide benchmarks for industry standards; and providing users with a comparison between at least one of (i) at least one element of their respective passive profiles and the relevant benchmark; and (ii) at least one element of their respective passive interaction profiles and the relevant benchmark.

19. The method in accordance with claim 1, wherein:

the analyzing of the user's stored data occurs with a predetermined frequency in order to update each of the passive profiles.

20. The method in accordance with claim 1, wherein the stored data further comprises or relates to at least one of inventory lists, data lists, business documentation, entertainment inventory comprising at least one of songs, movies, and electronic books, travel data, household data, personal data, grocery lists, utility data, sports equipment listings, hobby data, automobile records, personal interests data, performance data pertaining to a machine or a device.

21. A computerized system for improving engagement with a recommendation engine that recommends items, peers, and services, comprising:

a recommendation engine comprising a software application residing on an application server for recommending at least one of recommended items, peers, and services in response to a user inquiry;

a digital communications network connecting the recommendation engine to a plurality of user devices of a plurality of users;

a remote server for accessing the user devices over the digital communications network;

a data analyzer software application resident on the remote server for: remotely electronically accessing, via the digital communications network, data stored on the user devices; automatically analyzing the stored data to obtain information pertaining to the stored data;

a mapping tool associated with the data analyzer for automatically creating a respective passive profile for each of the users by mapping the information obtained from the analyzing of the stored data into newly determined keywords associated with the stored data;

a database associated with the recommendation engine for storing the respective passive profiles for use by the recommendation engine; and wherein:

the recommendation engine automatically provides the recommendations for the at least one of the recommended items, peers, and services to the respective users based on at least the respective passive profiles of the users, the stored data comprises at least software applications, computer hardware data, and electronic device data resident on the user devices, the stored data is obtained from two or more user devices of each of the users;

the users' interactions with the stored data and changes made to the stored data are tracked;

the respective passive profiles for the users are periodically automatically updated based on the tracking;

alerts are provided to the recommendation engine when changes to the passive profiles are detected based on the updating;

a query is automatically constructed for the respective user with keywords based on the detected changes;

the recommendation engine provides additional recommendations comprising at least one of additional recommended items, peers, and services returned by the query to the respective user; and the passive profiles are automatically created and updated without user input once access to the user devices is provided.

* * * * *